United States Patent
Iijima

(10) Patent No.: US 10,691,091 B2
(45) Date of Patent: Jun. 23, 2020

(54) CONTROLLER AND MACHINE LEARNING DEVICE

(71) Applicant: FANUC CORPORATION, Minamitsuru-gun, Yamanashi (JP)

(72) Inventor: Kazunori Iijima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 105 days.

(21) Appl. No.: 16/130,063

(22) Filed: Sep. 13, 2018

(65) Prior Publication Data

US 2019/0086888 A1 Mar. 21, 2019

(30) Foreign Application Priority Data

Sep. 15, 2017 (JP) ................................ 2017-177995

(51) Int. Cl.
| | | |
|---|---|---|
| *G05B 19/042* | (2006.01) | |
| *G05B 19/04* | (2006.01) | |
| *G05B 13/02* | (2006.01) | |
| *G06N 3/08* | (2006.01) | |
| *G06N 3/04* | (2006.01) | |
| *G05B 19/18* | (2006.01) | |
| *G06N 20/00* | (2019.01) | |

(52) U.S. Cl.
CPC ....... *G05B 19/042* (2013.01); *G05B 13/0265* (2013.01); *G05B 19/0405* (2013.01); *G05B 19/18* (2013.01); *G06N 3/0454* (2013.01); *G06N 3/08* (2013.01); *G06N 20/00* (2019.01); *G05B 2219/49062* (2013.01)

(58) Field of Classification Search
None
See application file for complete search history.

(56) References Cited

U.S. PATENT DOCUMENTS

| 7,254,461 B2 * | 8/2007 | Hosokawa ......... G05B 19/4063 700/173 |
| 9,990,590 B2 * | 6/2018 | Kawai .................. G06N 3/0427 |
| 10,418,921 B2 * | 9/2019 | Oho .................... G05B 13/0265 |
| 10,481,566 B2 * | 11/2019 | Sonoda ................ G05B 13/027 |
| 2006/0173571 A1 | 8/2006 | Hosokawa et al. |

(Continued)

FOREIGN PATENT DOCUMENTS

| JP | 03182910 A | 8/1991 |
| JP | 04358202 A | 12/1992 |

(Continued)

OTHER PUBLICATIONS

Japanese Notice of Reasons for Refusal for Japanese Application No. 2017-177995, dated Sep. 10, 2019 with translation, 8 pages.

*Primary Examiner* — Ramesh B Patel
(74) *Attorney, Agent, or Firm* — RatnerPrestia

(57) ABSTRACT

A controller is provided with a repeated control unit configured to calculate a position compensation value, based on a position command for each control period of a motor, a position deviation, which is the difference between the position command and a position of the motor, and a parameter for repeated control, and a machine learning device configured to predict the position compensation value calculated by the repeated control unit, and the machine learning device constructs a learning model so as to minimize an objective function based on the position command, the position deviation, and the position compensation value.

4 Claims, 4 Drawing Sheets

(56) References Cited

U.S. PATENT DOCUMENTS

| | | | |
|---|---|---|---|
| 2017/0154283 A1 | 6/2017 | Kawai et al. | |
| 2018/0120819 A1* | 5/2018 | Ishiwari | G05B 19/414 |
| 2018/0267499 A1* | 9/2018 | Tsuneki | G06N 20/00 |
| 2018/0284702 A1* | 10/2018 | Sonoda | G05B 13/027 |
| 2018/0354125 A1* | 12/2018 | Ueda | G05B 19/425 |
| 2018/0373223 A1* | 12/2018 | Ikai | G05B 19/404 |
| 2019/0028043 A1* | 1/2019 | Oho | H02P 23/0031 |

FOREIGN PATENT DOCUMENTS

| | | | |
|---|---|---|---|
| JP | 06309021 A | 11/1994 |
| JP | 07104823 A | 4/1995 |
| JP | 2006215740 A | 8/2006 |
| JP | 2017102613 A | 6/2017 |

* cited by examiner

CONTROLLER AND MACHINE LEARNING DEVICE

CROSS-REFERENCE TO RELATED APPLICATION

This application is a new U.S. Patent Application that claims benefit of Japanese Patent Application No. 2017-177995, filed Sep. 15, 2017, the disclosure of this application is being incorporated herein by reference in its entirety for all purposes.

BACKGROUND OF THE INVENTION

Field of the Invention

The present invention relates to a controller and a machine learning device, and more particularly, to a controller and a machine learning device configured to perform repeated learning control possibility determination and automatic adjustment by machine learning.

Description of the Related Art

Repeated learning control is known as a method to converge a control deviation to near zero, thereby improving the machining accuracy, in performing machining or the like in response to commands of identical patterns that are issued repeatedly. In this conventional repeated learning control, the identical patterns are repeatedly commanded in fixed pattern periods. Specifically, correction data that is obtained in accordance with a position deviation for each control period in an immediately preceding pattern period is previously stored in a learning memory. Based on this, by adding, to the position deviation for each control period in the current pattern period, correction data for a corresponding control period in the immediately preceding pattern period, stored in the learning memory, the position deviation is converged to zero (see Japanese Patent Applications Laid-Open Nos. 07-104823, 06-309021, etc.). The repeated learning control is effective for repeated execution of the commands of the identical patterns in the case of, for example, piston lathes having cross-sectional shapes of the identical patterns.

Since the control behavior for the case in which the repeated learning control is performed also depends on the operation shape, speed and the like, however, parameters for stabilizing the operation of a control object cannot easily be fixed. In order to stabilize the control behavior, therefore, an experienced operator must repeat parameter adjustment and operational trials for the control object. Moreover, depending on the contents and object of control, it may not be appropriate to use the repeated learning control. However, even the experienced operator cannot immediately determine whether or not the use of the repeated learning control is appropriate and can only determine it from the result of repetition of the above parameter adjustment.

SUMMARY OF THE INVENTION

Accordingly, the object of the present invention is to provide a controller and a machine learning device capable of determining whether or not repeated learning control is applicable to a control object having nonlinearity and capable of fixing parameters for the repeated learning control.

A controller according to the present invention controls a machine tool driven by a motor and includes a command creation unit configured to create a position command for each control period of the motor, a position detection unit configured to detect a position of the motor, a position deviation creation unit configured to create a position deviation, which is the difference between the value of the position command created by the command creation unit and the position of the motor detected by the position detection unit, a repeated control unit configured to calculate a position compensation value based on the value of the position deviation created by the position deviation creation unit and a parameter for repeated control, and a machine learning device configured to predict the position compensation value calculated by the repeated control unit. The machine learning device is configured to construct a learning model so as to minimize an objective function based on the position command, the position deviation, and the position compensation value.

The machine learning device may be configured so that its learning model is a nonlinear model combining a plurality of perceptrons and to determine the weight of a joint of the nonlinear model so as to minimize the objective function. Moreover, the machine learning device may be configured to determine the repeated control parameter based on the weight of the joint of the nonlinear model if the objective function can be minimized.

The machine learning device may be configured to disable an operation of the repeated control unit if the objective function cannot be minimized.

According to the present invention, a final control condition can be obtained without requiring an adjustment trial in repeated learning control, so that a risk of an oscillation behavior in an adjustment process can be eliminated. Moreover, it is possible to obtain an evaluation value of stability of a control object even though it is difficult to quantitatively evaluate the stability thereof.

DETAILED DESCRIPTION OF THE PREFERRED EMBODIMENTS

Figure 1:
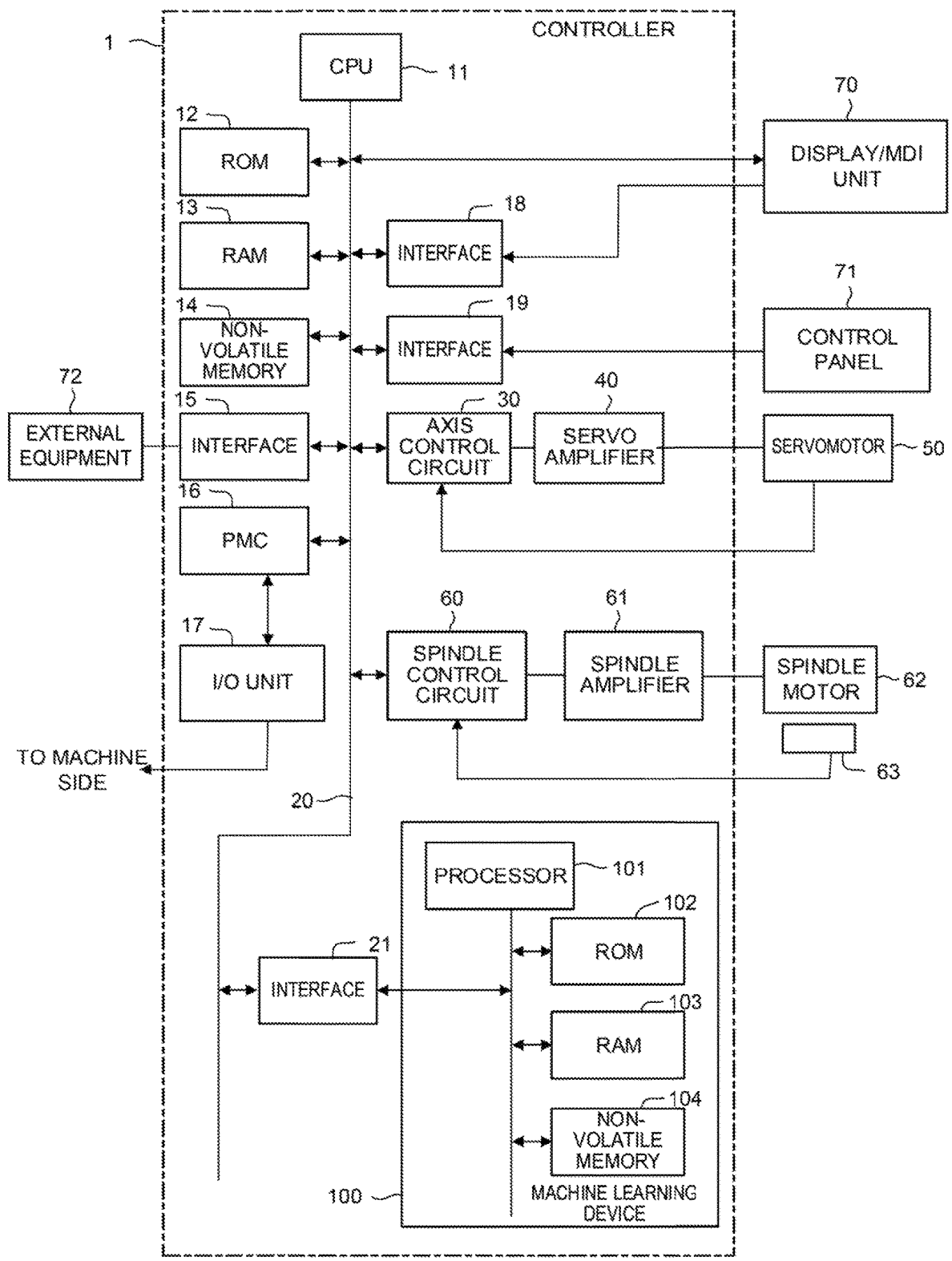
FIG. 1 is a schematic hardware configuration diagram of a controller according to one embodiment of the present invention.

FIG. 1 is a schematic hardware configuration diagram showing principal parts of a controller according to a first embodiment.

A controller 1 can be implemented as a controller for controlling, for example, a machine tool. A CPU 11 of the controller 1 according to the present embodiment is a processor for generally controlling the controller 1. The CPU 11 reads out a system program in a ROM 12 through a bus 20 and controls the entire controller 1 according to this system program. A RAM 13 is temporarily stored with temporary calculation data and display data, various data input by an operator through an input unit (not shown), and the like.

A non-volatile memory 14 is constructed as a memory that is, for example, backed up by a battery (not shown) so that its storage state can be maintained even when the controller 1 is turned off. The non-volatile memory 14 is stored with a program for repeated control read in through an interface 15, a program input through the display/MDI unit 70 (described later), and the like. The program for repeated control stored in the non-volatile memory 14 may be expanded in the RAM 13 at the time of use. Moreover, various system programs (including a system program for controlling exchange with a machine learning device 100 described later) required for the operation of the controller 1 are previously written in the ROM 12.

The interface 15 is an interface for connecting the controller 1 and external equipment 72 such as an adapter. The program for repeated control and various parameters are read in from the side of the external equipment 72. Moreover, the program for repeated control and the various parameters edited in the controller 1 can be stored into an external storage means through the external equipment 72. A programmable machine controller (PMC) 16 controls peripheral devices (e.g., an actuator such as a robot hand for tool change) of the machine tool by outputting signals to them through an I/O unit 17 according to a sequential program stored in the controller 1. Furthermore, on receiving signals from various switches on a control panel on the main body of the machine tool, the PMC 16 performs necessary signal processing and then delivers the processed signals to the CPU 11.

The display/MDI unit 70 is a manual data input unit equipped with a display, keyboard and the like, and an interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling the axes of the machine tool receives a movement command amount of each axis from the CPU 11 and outputs a command for the axis to a servo amplifier 40. On receiving this command, the servo amplifier 40 drives a servomotor 50 for moving the axes of the machine tool. The servomotor 50 for the axes has a position/speed detector built-in and feeds back a position/speed feedback signal from this position/speed detector to the axis control circuit 30, thereby performing position/speed feedback control. In the hardware configuration diagram of FIG. 1, the axis control circuit 30, servo amplifier 40, and servomotor 50 are each shown as being only one in number. Actually, however, these elements are provided corresponding in number to the axes of the machine tool to be controlled.

A spindle control circuit 60 receives a spindle rotation command for the machine tool and outputs a spindle speed signal to a spindle amplifier 61. On receiving this spindle speed signal, the spindle amplifier 61 rotates a spindle motor 62 of the machine tool at a commanded rotational speed, thereby driving a tool.

A position coder 63 is connected to the spindle motor 62. The position coder 63 outputs feedback pulses in synchronism with the rotation of a spindle and the feedback pulses are read by the CPU 11.

An interface 21 is an interface for connecting the controller 1 and the machine learning device 100. The machine learning device 100 includes a processor 101 for controlling the entire machine learning device 100, a RAM 103 for temporary storage in each step of processing related to machine learning, and a non-volatile memory 104 used to store learning models and the like. The machine learning device 100 can observe various pieces of information (e.g., movement command amount of each axis output from the CPU 11 to the axis control circuit 30, position command value, position/speed feedback value obtained from the servomotor 50, etc.) that can be acquired by the controller 1 through the interface 21. Moreover, based on the values output from the machine learning device 100, the controller 1 determines whether or not repeated learning control is applicable to the control of a control object and fixes parameters for the repeated learning control.

Figure 2:
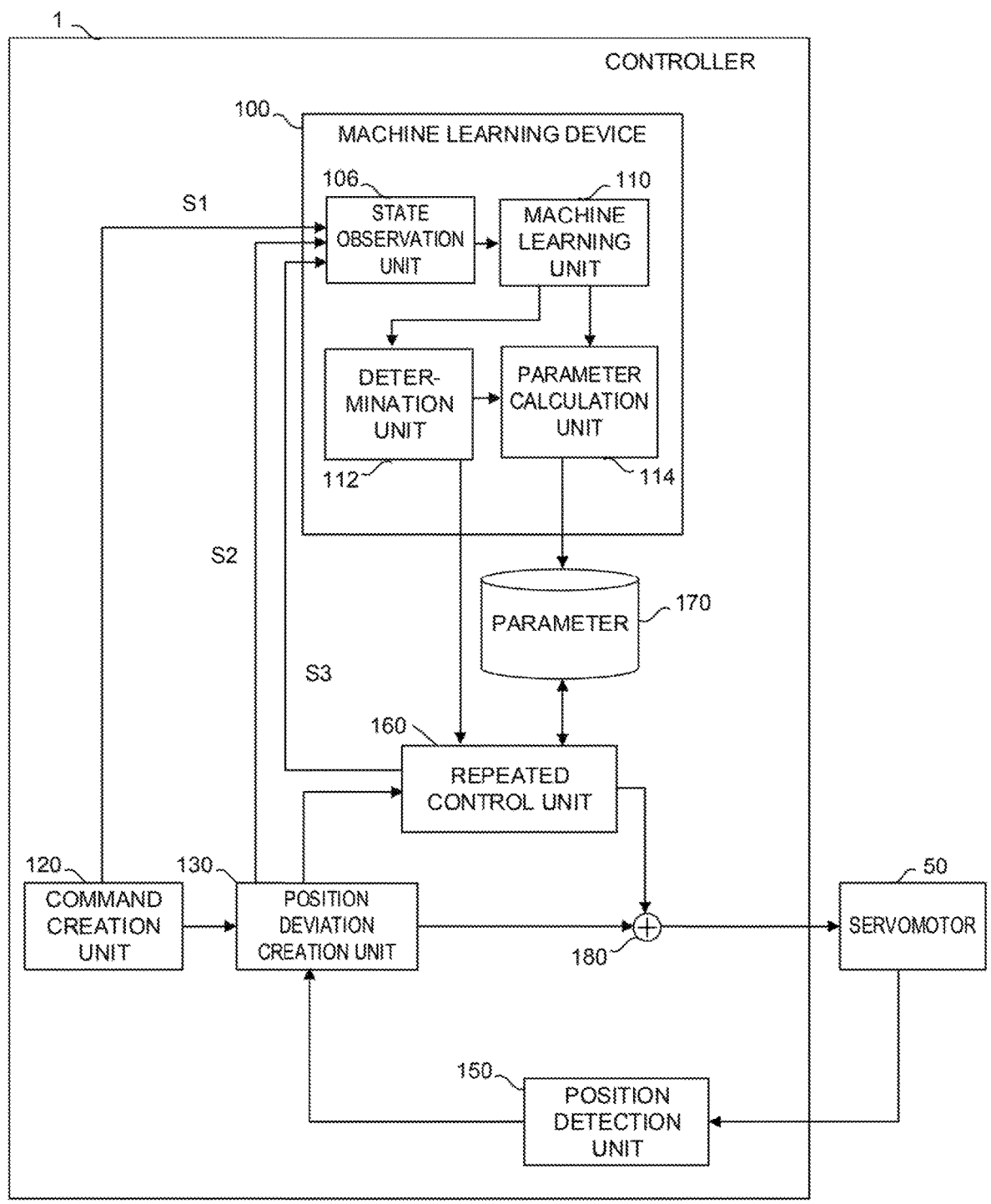
FIG. 2 is a schematic functional block diagram of the controller of FIG. 1.

FIG. 2 is a schematic functional block diagram of the controller 1 and the machine learning device 100 according to one embodiment.

Each of functional blocks shown in FIG. 2 is implemented as the CPU 11 of the controller 1 and the processor 101 of machine learning device 100 shown in FIG. 1 execute their respective system programs and control operations of various parts (axis control circuit 30, etc.) of the controller 1 and the machine learning device 100 for each control period T.

The controller 1 has a function to perform control so that the position of the servomotor 50 moves in a predetermined pattern in a repeated control period L. The controller 1 of the present embodiment includes a command creation unit 120, position deviation creation unit 130, position detection unit 150, and repeated control unit 160.

The command creation unit 120 creates a position command for the servomotor 50 for each control period T of the controller 1 based on a command read out from the program for repeated control stored in the non-volatile memory 14, and outputs the created position command to the position deviation creation unit 130 and the machine learning device 100.

The position deviation creation unit 130 creates a position deviation, which is the difference between the position command for the servomotor 50 received from the command creation unit 120 and the position of the servomotor 50 detected by the position detection unit 150, and outputs the created position deviation to the servomotor 50, repeated control unit 160, and machine learning device 100.

The command creation unit 120, position deviation creation unit 130, and position detection unit 150 are structures for position feedback control that is conventionally performed. In the repeated learning control, the repeated control unit 160 is added in addition to these structures.

The repeated control unit 160 calculates a position compensation value based on the position deviation for each control period T received from the position deviation creation unit 130 and parameters stored in a parameter storage unit 170, and outputs the calculated position compensation value. If a learning model is being constructed by the machine learning device 100, the repeated control unit 160 calculates the position compensation value by using a parameter (initial parameter set by the operator or the like in the initial stage of the operation of the controller 1) currently stored in the parameter storage unit 170. If it is determined that the repeated learning control is applicable after the completion of the construction of the learning model by the machine learning device 100, in contrast, the repeated control unit 160 calculates the position compensation value by using the parameters fixed by the machine learning device 100 and stored in the parameter storage unit 170. The position compensation value output by the repeated control unit 160 is added, in an adder 180, to the position deviation output from the position deviation creation unit 130, and the result of the addition is output to the servomotor 50. The repeated control unit 160 is a structure for the repeated learning control disclosed in conventional technologies such as Japanese Patent Applications Laid-Open Nos. 07-104823 and 06-309021. Since the details of the operation of the repeated control unit 160 are already known, a detailed description thereof is omitted herein.

On the other hand, the machine learning device 100 of the controller 1 performs the so-called machine learning based on the position command for each control period T output from the command creation unit 120 and the position deviation for each control period T output from the position deviation creation unit 130, and based on the result of the learning, determines the applicability of the repeated machine learning and fixes the parameters (parameters stored in the parameter storage unit 170) for the repeated learning control.

As indicated by the functional blocks in FIG. 2, the machine learning device 100 of the controller 1 includes a state observation unit 106, machine learning unit 110, determination unit 112, and parameter calculation unit 114. The state observation unit 106 observes, as state variables S, position command data S1 for each control period T output from the command creation unit 120 and position deviation data S2 for each control period T output from the position deviation creation unit 130. The machine learning unit 110 performs the machine learning based on the state variables S. The determination unit 112 determines the applicability of the repeated learning control based on the result of the machine learning by the machine learning unit 110. The parameter calculation unit 114 calculates and outputs the parameters for the repeated learning control based on the result of the learning by the machine learning unit 110.

The state observation unit 106 observes, as the state variables S, the position command data S1 for each control period T output from the command creation unit 120, the position deviation data S2 for each control period T output from the position deviation creation unit 130, and position compensation value data S3 indicative of the position compensation value output from the repeated control unit 160, in a state in which the repeated learning control based on the parameters stored in the parameter storage unit 170 is being performed. While the learning by the machine learning unit 110 is being performed, the state observation unit 106 observes the position command data S1 for each control period T output from the command creation unit 120, the position deviation data S2 for each control period T output from the position deviation creation unit 130, and the position compensation value data S3 indicative of the position compensation value output from the repeated control unit 160.

Figure 3:
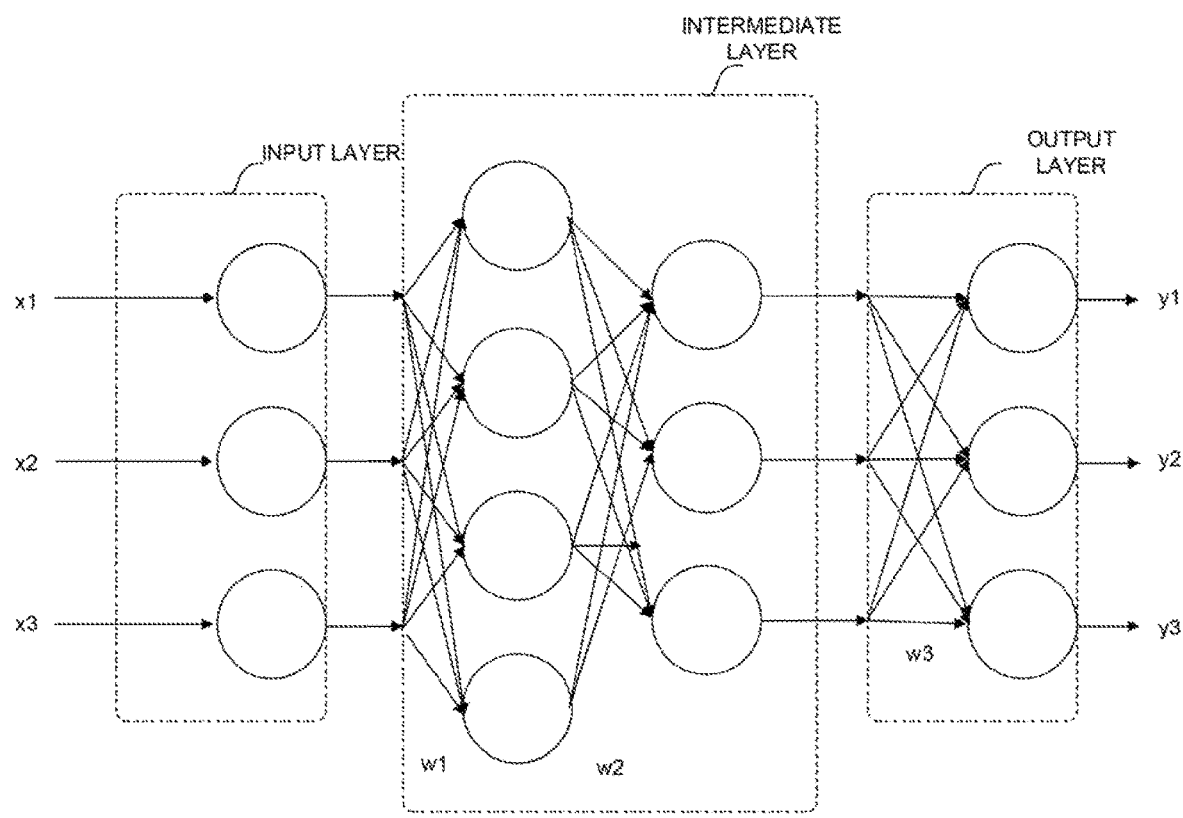
FIG. 3 is a diagram illustrating multi-layer perceptrons.

The machine learning unit 110 generates the learning model for the repeated learning control (i.e., performs the machine learning) according to an arbitrary learning algorithm, collectively called the machine learning, based on the position command data S1, position deviation data S2, and position compensation value data S3 observed by the state observation unit 106. The machine learning unit 110 constructs the learning model based on a command value (position command data S1), feedback value (position deviation data S2), and response (position compensation value data S3) thereto, in the state in which the repeated learning control based on the parameters stored in the parameter storage unit 170 is being performed. A nonlinear model, such as that illustrated in FIG. 3, which combines a plurality of perceptrons can be used for the learning model constructed by the machine learning unit 110. In such a case, the construction of the learning model (machine learning) by the machine learning unit 110 is performed by adjusting machine learning parameters w (weights of joints between the perceptrons; weight matrices w1, w2 and w3 in FIG. 3) so as to minimize the value of a loss function L(w) given by the following expression (1):

$$L(w) = \sum_{i=1}^{N} l(r^i, y_1^i; w) \to \min \qquad (1)$$

The machine learning unit 110 repeats processes for minimizing the value of the above loss function L(w) based on the state variables S observed by the state observation unit 106. When the machine learning unit 110 has succeeded in reducing the value of the loss function L(w) to a predetermined threshold or less, for example, it outputs a message to the effect that the construction of the learning model is achieved, whereupon the construction of the learning model (machine learning) is terminated. In contrast, when the machine learning unit 110 has failed to reduce the value of the loss function L(w) to the predetermined threshold or less in a predetermined number of processes for minimizing the value of the above loss function L(w) (i.e., when the construction of the learning model failed to convert), after repeating the minimization processes based on the state variables S observed by the state observation unit 106, for example, it outputs a message to the effect that the construction of the learning model is not achieved, whereupon the construction of the learning model (machine learning) ends.

The determination unit 112 determines the applicability of the repeated learning control based on a success/failure output for the construction of the learning model from the machine learning unit 110. If the construction of the learning model by the machine learning unit 110 is successful, the determination unit 112 determines that the repeated learning control is applicable to an ordinary control system and outputs a message accordingly. In contrast, if the construction of the learning model by the machine learning unit 110 is unsuccessful, the determination unit 112 determines that the repeated learning control is inapplicable to the control system and turns off the machine learning device 100.

If it is determined by the determination unit 112 that the repeated learning control is applicable to the ordinary control system, the parameter calculation unit 114 converts the machine learning parameters w of the learning model constructed by the machine learning unit 110 to repeated learning control parameters p by using a preset mapping function. The mapping function used by the parameter calculation unit 114 to convert the machine learning parameters w to the repeated learning control parameters p may suitably be a mapping function previously obtained by an experiment or the like from machine learning parameters of the learning model constructed by the machine learning unit 110 in the ordinary control system to which the repeated learning control is applicable and control parameters learned by the repeated learning control applied to the ordinary control system.

Moreover, the learning model (learned model) constructed by the machine learning unit 110 can also be applied to other controllers that perform the same repeated control. In factories in which a plurality of machine tools of the same model are installed to machine identical products, for example, the learning model is constructed on the single controller 1 by the above machine learning unit 110 so that the repeated learning control parameters p calculated by the parameter calculation unit 114 can be set and used in the controllers for controlling the individual machine tools, based on the constructed learned model.

Figure 4:
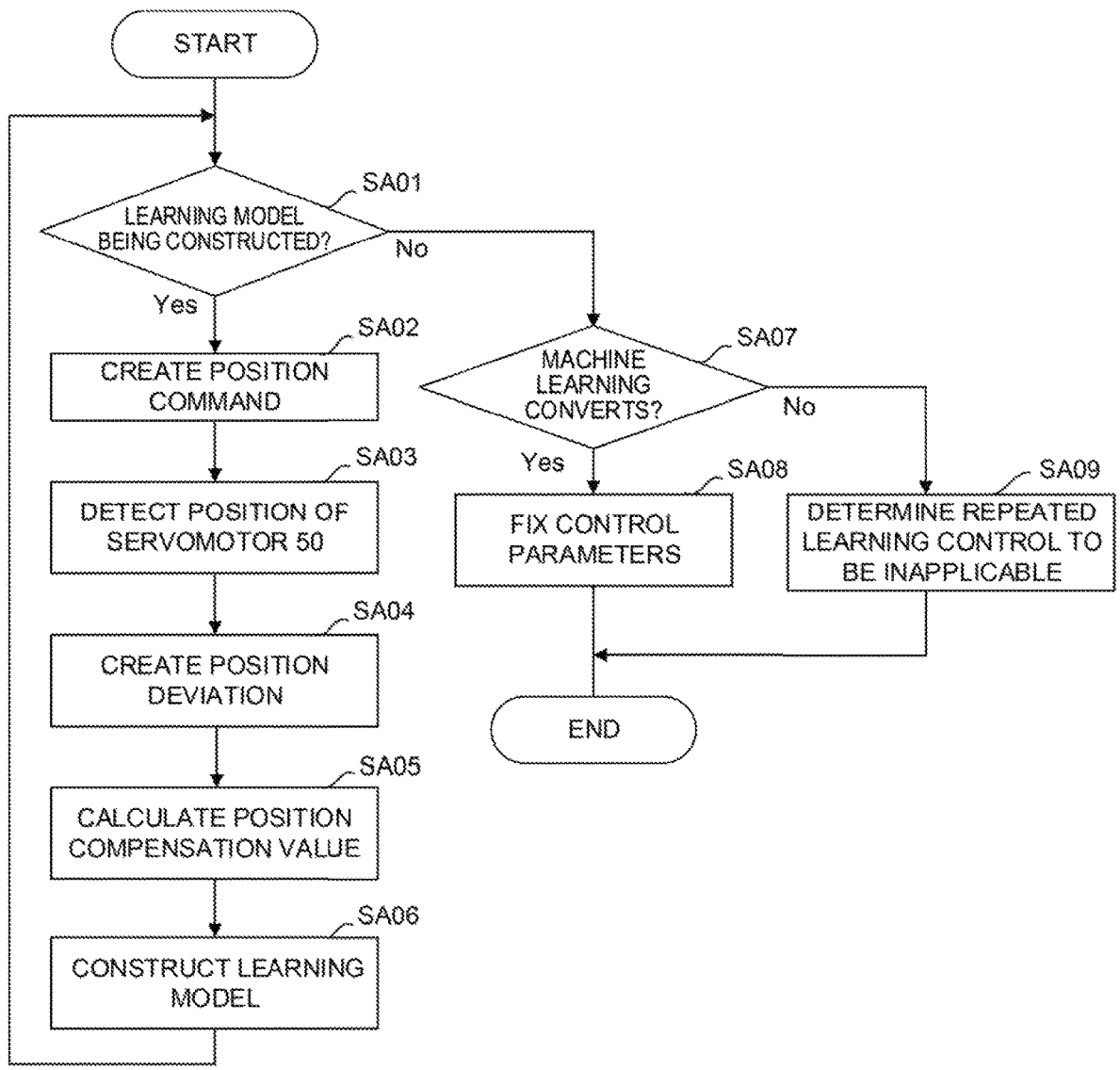
FIG. 4 is a flowchart showing an outline of processing executed by the controller of FIG. 1.

FIG. 4 is a schematic flowchart of processing executed on the controller 1 of the present embodiment.

[Step SA01] The controller 1 determines whether or not the machine learning unit 110 is constructing the learning model. If the machine learning unit 110 is constructing the learning model, the processing proceeds to Step SA01. If the construction of the learning model by the machine learning unit 110 is finished, the processing proceeds to Step SA07.

[Step SA02] The command creation unit 120 creates the position command for the servomotor 50 for each control period T of the controller 1 based on the command read out from the program for repeated control stored in the non-volatile memory 14, and outputs the created position command to the position deviation creation unit 130 and the machine learning device 100.

[Step SA03] The position detection unit 150 detects the position of the servomotor 50.

[Step SA04] The position deviation creation unit 130 creates the position deviation which is a difference between the position command for the servomotor 50 created in Step SA02 and the position of the servomotor 50 detected in Step SA03.

[Step SA05] The repeated control unit 160 calculates the position compensation value based on the position deviation created in Step SA02, the position deviation created in Step SA04, and the parameters stored in the parameter storage unit 170.

Although the value of the position command created by the command creation unit is not input to the repeated control unit 160, there is a case (override of operating speed) in which the position compensation value is calculated by the value of a position command. The machine learning device 100 may be configured to serve as an simulator for a behavior of repetitive control, and, in this case, the machine learning device 100 cannot perform simulation unless it does not receive the value of position command.

[Step SA06] The machine learning unit 110 constructs the learning model based on the position command of the servomotor 50 created in Step SA02 (or the position command observed by the state observation unit 106), the position deviation created in Step SA04 (or the position deviation observed by the state observation unit 106), and the position compensation value calculated in Step SA05 (or the position compensation value observed by the state observation unit 106).

[Step SA07] The determination unit 112 determines whether or not the construction of the learning model (machine learning) by the machine learning unit 110 converts. If the construction of the learning model converted, the processing proceeds to Step SA08. If the construction of the learning model failed to convert, the processing proceeds to Step SA09.

[Step SA08] The determination unit 112 enables the repeated learning control by the repeated control unit 160, based on the assumption that the repeated learning control is executable. The parameter calculation unit 114 converts the machine learning parameters w of the learning model constructed by the machine learning unit 110 to the control parameters p and stores the converted control parameters p in the parameter storage unit 170.

[Step SA09] The determination unit 112 determines that the repeated learning control is not executable and disables the repeated learning control by the repeated control unit 160.

In the controller 1 according to the one embodiment of the present invention, the repeated learning parameters can automatically be obtained if the value of the loss function $L(w)$ converges to a minimum value in the learning model construction (search trial for machine learning parameters) by the machine learning unit 110. If the spindle speed is set within a moderate speed range in performing the repeated control in a piston lathe, for example, the value of the loss function $L(w)$ converges. If the spindle speed is set in an overspeed range, however, the value of the loss function $L(w)$ does not converge but diverges, so that it can be ascertained from the operation of the machine learning unit 110 that the repeated learning is inapplicable.

While an embodiment of the present invention has been described herein, the invention is not limited to the above-described embodiment and may be suitably modified and embodied in various forms.

For example, the learning algorithm, calculation algorithm and the like executed by the machine learning device 100 are not limited to those described above and various algorithms are available.

Moreover, although the controller 1 and the machine learning device 100 are described as being devices having different CPUs (processors) in the above embodiment, the machine learning device 100 may alternatively be implemented by the CPU 11 of the controller 1 and the system programs stored in the ROM 12.

Furthermore, in the above embodiment, the learning model is constructed based on the position command value (position command data S1), feedback value (position deviation data S2), and response (position compensation value data S3) thereto, as inputs. In order to reflect the dynamic characteristics of motors and the like, however, torque command values, motor currents and the like may be used as input values.

The invention claimed is:

1. A controller for controlling a machine tool driven by a motor, the controller comprising:
a command creation unit configured to create a position command for each control period of the motor;
a position detection unit configured to detect a position of the motor;
a position deviation creation unit configured to create a position deviation, which is the difference between the value of the position command created by the command creation unit and the position of the motor detected by the position detection unit;
a repeated control unit configured to calculate a position compensation value based on the value of the position deviation created by the position deviation creation unit and a parameter for repeated control; and
a machine learning device configured to predict the position compensation value calculated by the repeated control unit,
wherein the machine learning device constructs a learning model so as to minimize an objective function based on the position command, the position deviation, and the position compensation value.

2. The controller according to claim 1, wherein the learning model of the machine learning device is a nonlinear model combining a plurality of perceptrons, and the machine learning device determines the weight of a joint of the nonlinear model so as to minimize the objective function.

3. The controller according to claim 2, wherein the machine learning device determines the repeated control parameter based on the weight of the joint of the nonlinear model if the objective function can be minimized.

4. The controller according to claim 1, wherein the machine learning device disables an operation of the repeated control unit if the objective function cannot be minimized.

* * * * *